March 21, 1944.　　　　S. JORY　　　　2,344,881
VEHICLE CLUTCH AND TRANSMISSION CONTROL
Filed April 1, 1942
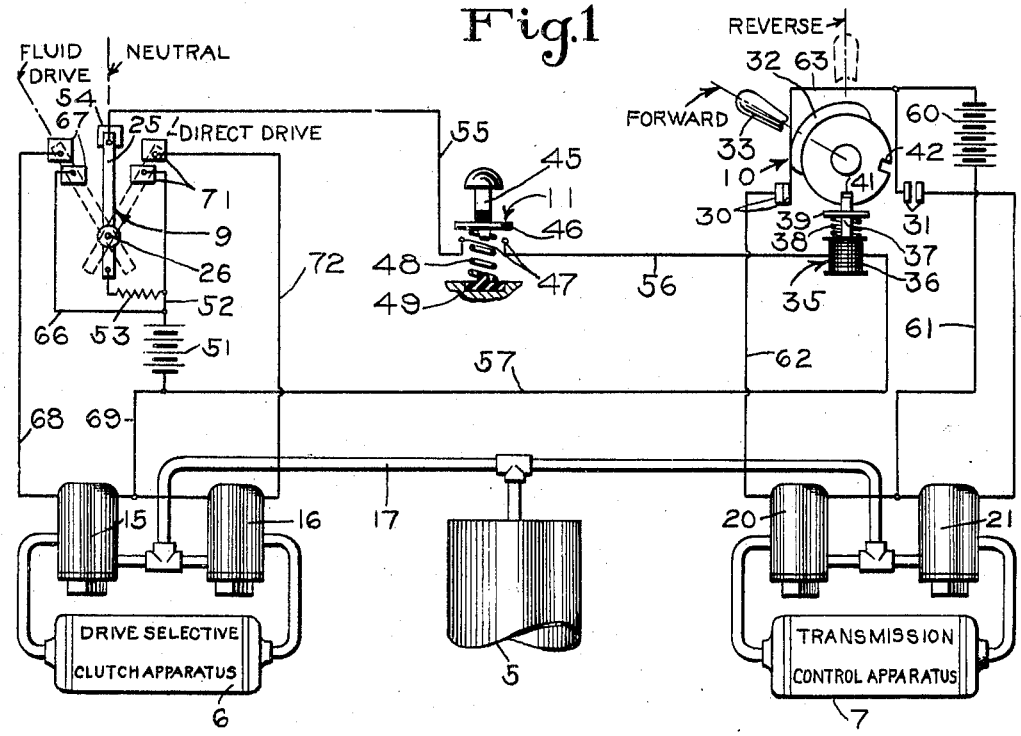
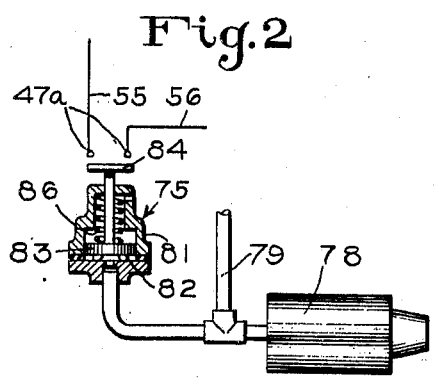
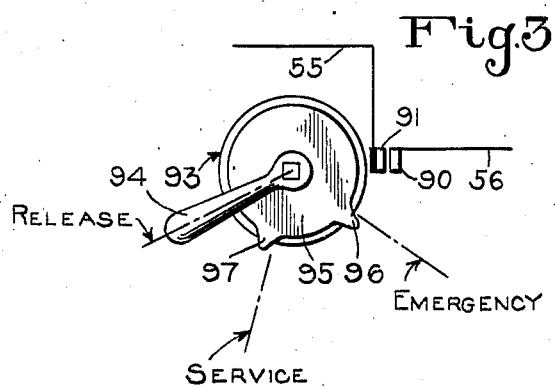
INVENTOR
Samuel Jory
BY
ATTORNEY Patented Mar. 21, 1944

2,344,881

UNITED STATES PATENT OFFICE 2,344,881

VEHICLE CLUTCH AND TRANSMISSION CONTROL

Samuel Jory, Irwin, Pa., assignor to The Westinghouse Air Brake Company, Wilmerding, Pa., a corporation of Pennsylvania Application April 1, 1942, Serial No. 437,186

7 Claims. (Cl. 192—3.5)

This invention relates to drive control systems for power vehicles, and more particularly to means for controlling operation of a vehicle equipped with multiple drive means and separate transmission control means.

In order to provide adequate control of a Diesel driven vehicle of a type employed in a special service, it has been proposed to equip such a vehicle with both transmission gearing for either forward or reverse operation, and a separate drive selector apparatus, which is operative to connect a single propulsion shaft to the engine through a fluid drive mechanism during low speed operation and by direct mechanical drive at higher speeds. The drive selector apparatus includes a power operated clutch mechanism which is controlled through the medium of a manually operable switch having "fluid drive" and "direct drive" positions and an intermediate "neutral" or clutch disengaging position. The transmission control apparatus is also power actuated and is governed by means of a manually operated switch having "forward" and "reverse" positions. It is of course necessary to provide means preventing operation of the forward-and-reverse transmission switch while the vehicle is being operated, and apparatus has been designed to accomplish this result by so interlocking the transmission switch with the drive selector switch as to require movement of the latter to "neutral" position before the transmission control switch can be actuated.

In the operation of a vehicle having the drive selective clutch apparatus and transmission control apparatus as just described, favorable grade conditions may occasionally permit coasting with the drive selector switch in neutral position. If the forward-and-reverse transmission switch is in this situation unlocked and thereby rendered operable, the danger thus arises that the operator may inadvertently shift the position of that switch while the vehicle is under way, with consequent damage to the equipment.

It is an object of my invention to provide an improved vehicle clutch and transmission control system embodying means for preventing accidental movement of a forward-and-reverse transmission switch in the above type of equipment while the vehicle is in motion, regardless of the position in which the associated drive selector switch is placed.

A further object is to provide a control system embodying this desirable safety feature in a simple and inexpensive form readily adaptable for installation on existing equipment.

Other objects and advantages of the invention will appear in the following more detailed description thereof, taken in connection with the accompanying drawing, in which Fig. 1 is a diagrammatic view of a vehicle clutch and transmission control system constructed in accordance with the invention;

Fig. 2 is a diagrammatic, fragmentary view of a different form of safety switch device that may be substituted for the push button switch shown in Fig. 1; and Fig. 3 is a diagrammatic, fragmentary view of still another safety switch construction which may be employed in connection with the apparatus shown in Fig. 1.

*Embodiment shown in Fig. 1*

Referring to Fig. 1, the equipment carried by the Diesel driven vehicle may include a source of fluid under pressure such as a reservoir 5, drive selective clutch apparatus indicated generally at 6, fluid pressure responsive transmission control apparatus similarly indicated at 7, a drive selector switch 9, a transmission or forward-and-reverse switch 10, and an auxiliary safety or interlock control switch 11.

The drive selective clutch apparatus is not illustrated in detail in Fig. 1, but it will be understood that this apparatus comprises a clutch operative from a neutral position to connect the Diesel engine to the vehicle propulsion shaft either by way of a fluid drive or torque converter mechanism (not shown), or through a direct mechanical drive (not shown). Associated with the clutch apparatus are a pair of magnet valves 15 and 16, each of which is of the usual construction comprising spring biased valve means and electroresponsive magnet means for moving the valve means in opposition to the spring pressure. For the purposes of the present disclosure, it will be understood that upon energization of the magnet valve device 15, fluid under pressure is supplied from the reservoir 5, by way of a suitable pipe 17 and the communication established by the magnet valve device 15, to the clutch apparatus 6 for thereby positioning the clutch apparatus to establish fluid drive operation of the vehicle, and that upon energization of the other magnet valve device 16, fluid under pressure is supplied therethrough to the clutch apparatus for establishing a direct drive connection. The drive selective clutch apparatus 6 is constructed and arranged to assume a neutral position, thus disestablishing all connection between the engine and propulsion shaft, when both of the magnet valve devices 15 and 16 are deenergized. An apparatus of this type is disclosed in detail in the United States Patent No. 2,279,365, issued to Mortimer B. Cameron on April 14, 1942.

As in the case of the clutch apparatus just described, the transmission control apparatus 7 is illustrated in diagrammatic form only, it being sufficient for comprehension of the present invention to understand that the apparatus comprises suitable forward and reverse transmission gears and fluid pressure responsive means for shifting them in accordance with operation of a pair of magnet valve devices 20 and 21, the magnet valve device 20 being operative when energized to supply fluid under pressure from the reservoir 5 to condition the transmission control apparatus 7 for forward propulsion of the vehicle, and the other magnet valve device 21 being operative when energized to effect conditioning of the apparatus for reverse propulsion of the vehicle.

The drive selector switch 9 comprises a manually movable contact bar 25 which is pivotally mounted on a suitably insulated pin 26 for movement to fluid drive, neutral, and direct drive positions. This switch is of course adapted to be located in the operator's control portion of the vehicle, and is operative as hereinafter explained for controlling the drive selective apparatus.

The transmission control switch 10 is likewise mounted in a suitable position within reach of the operator of the vehicle, and comprises a pair of normally open contact elements 30, a similar pair of normally open contact elements 31, a rotatably mounted switch actuator cam 32 movable by a handle 33 to either forward or reverse positions, and an electroresponsive locking device 35 which is cooperative with the cam 32. The locking device 35 comprises a magnetic coil 36 within which is operably mounted a plunger 37 which is urged outwardly and into engagement with a suitably notched surface of the cam 32 under the force of a coil spring 38, which is interposed between the coil and a collar 39 carried by the plunger. A forward positioning notch 41 and a reverse positioning notch 42 are formed in the surface of the cam 32 adjacent the locking device, each of the notches being adapted to receive the end of the plunger 37 when the cam 32 is in a corresponding position with the magnetic core 36 deenergized.

The interlock safety switch 11 is preferably mounted in the operator's portion of the vehicle and conveniently near the switch devices 9 and 10, and comprises a push button or plunger 45 having secured thereto a suitably insulated contact element 46 which is constructed and arranged for bridging engagement with a pair of stationary contact elements 47. A spring 48 is interposed between the contact elements 46 and a stationary insulating base member 49 for urging the contact element away from the contact elements 47.

According to the invention, the interlock control switch 11 is interposed in an electric circuit through the medium of which the electromagnetic locking device 35 associated with the transmission control switch 10 is controlled in accordance with the positioning of the drive selector switch 9, the interlock switch serving in cooperation with the locking device to prevent unintentional movement of the transmission control switch. Thus if it is desired to operate the vehicle from a position of rest, with the contact bar 25 of the drive selector switch 9 disposed in neutral position as shown in Fig. 1, the operator must first depress the plunger 45 to effect contact between the contact elements 46 and 47, thereby establishing a circuit for energizing the magnetic coil 36, which circuit includes the positive terminal of a battery 51, a conductor 52, a flexible conductor 53, the movable contact bar 25, a stationary contact element 54, a conductor 55, the connected contact elements 46 and 47, a conductor 56, the coil 36, and a return conductor 57 leading to the negative terminal of the battery. With the coil 36 thus energized, the plunger 37 is withdrawn from engagement with the cam 32 against the opposing force of the spring 38, and the cam 32 is then free for operation by the handle 33 to the desired position, the forward position being indicated in Fig. 1.

As the cam 32 is rotated to the forward position, it effects movement of one of the normally spaced pair of contact elements 30 into engagement with the other, thus closing a circuit for energizing the magnet valve 20, the circuit including the positive terminal of a battery 60, a conductor 61, the electromagnet of the magnet valve, a conductor 62, the connected contact elements 30, and a conductor 63 leading to the negative terminal of the battery. Upon energization of the magnet valve device 20, fluid under pressure is supplied thereby to the transmission control apparatus 7 for shifting the associated gears to their forward propulsion position. The push button 45 of the interlock safety switch 11 may then be released, whereupon the magnetic coil 36 is deenergized for permitting the spring 38 to force the plunger 37 into the notch 41 in the cam 32 for locking the transmission control switch 10 in its forward position as shown in the drawing.

To set the vehicle in motion the operator then moves the contact bar 25 of the drive selector switch 9 into its fluid drive position, thus effecting energization of the fluid drive magnet valve 15 through a circuit which includes the conductor 66 leading from the positive terminal of battery 51, a pair of contact elements 67 which are bridged by the contact bar 25, a conductor 68, the winding of the magnet valve 15, and a return conductor 69 connected to the negative terminal of the battery. The resultant operation of the drive selective clutch apparatus 6 will be understood from the explanation hereinbefore presented.

When the speed of the vehicle has been sufficiently increased, the operator may shift the contact bar 25 of the drive selector switch 9 to direct drive position, wherein a circuit is established for energizing the other or direct drive magnet valve 16 by way of the conductor 52, a pair of contact elements 71 bridged by the contact bar, a conductor 72, the winding of the magnet valve, and the return conductor 69.

Meanwhile, it will be apparent that while the vehicle is operated through the medium of the drive selector switch 9, inadvertent movement of the transmission control switch 10 from the selected position is rendered impossible, by reason of the fact that the interlock safety switch 11, in the normal position thereof, prevents closure of the circuit for the magnetic coil 36 of the locking device associated with the transmission control switch.

*Embodiment shown in Fig. 2*

While the interlock safety control switch 11 shown in Fig. 1 serves to prevent unintentional operation of the transmission control switch during coasting operation of the vehicle with the drive selector switch in neutral position, it may be desirable to provide another type of interlock means which will render impossible even a malicious tampering with the vehicle control, by interlocking the transmission control switch and the drive selector switch with the vehicle brake system. One such interlocking means is illustrated in diagrammatic form in Fig. 2 of the drawing, in which is shown an auxiliary interlocking safety switch device 75 constructed and arranged for substitution in place of the interlock safety switch 11 shown in Fig. 1, for controlling the circuit including the conductors 55 and 56. The interlock safety switch 75 is adapted for association with a brake cylinder 78 that forms part of the usual fluid pressure brake equipment (not otherwise shown) of the vehicle, and which is constructed and arranged to effect an application of the brakes when supplied with fluid under pressure by way of a pipe 79. The interlock safety control switch 75 comprises a casing 81 having formed therein a piston chamber 82 containing a piston 83, which is arranged to operate a suitably insulated contact element 84. The contact element 84 is normally spaced from a pair of stationary contact elements 47a under the force of a coil spring 86, which acts against the piston 83 in opposition to the pressure of fluid in the chamber 82 communicating with the brake cylinder pipe 79.

From the description of the equipment shown in Fig. 1 it will be apparent that if the interlock safety control switch 75 is interposed in the circuit controlling the locking device 35 of the transmission control switch 10, any movement of the transmission control switch will be prevented unless an application of the brakes has been made. The interlock safety control switch 75 thus functions to prevent any movement whatever of the transmission control switch unless the vehicle has first been brought to a standstill.

*Embodiment shown in Fig. 3*

Still another form of interlock safety control switch means is disclosed in Fig. 3 of the drawing, wherein the switch mechanism is shown in diagrammatic form as comprising a stationary contact element 90 and a movable contact element 91 normally biased away from the stationary contact element, the two contact elements being constructed and arranged to control the magnetic locking circuit including the wires 55 and 56, in place of the switch 11 shown in Fig. 1. The switch contact elements 91 and 90 shown in Fig. 3 are cooperatively associated with a brake valve device indicated generally by the reference character 93, which may comprise any suitable construction and which is operative through the medium of a handle 94 having release, service, and emergency position for controlling the fluid pressure brake system of the vehicle. Rotatably mounted on the brake valve device 93 for operation by the handle 94 is a cam member 95 having spaced cam surfaces 96 and 97, which are adapted to be brought into operative engagement with the movable contact element 91 when the handle is moved into emergency and service positions, respectively.

It will thus be seen that so long as the brake valve device is disposed in release position, or in any other position than the brake application positions designated as Service and Emergency, the switch contact elements 90 and 91 will remain in circuit-open position, so that the associated transmission control switch 10 (see Fig. 1) will remain locked against movement. Upon operation of the brake valve device 93 to effect either a service or an emergency application of the brakes, however, the corresponding cam surface 96 or 97 will be operated to move the contact element 91 into engagement with the contact element 90 for closing the associated circuit which includes the conductors 55 and 56, thus accomplishing the result hereinbefore explained in connection with the apparatus shown in Fig. 1.

Having now described my invention, what I claim as new and desire to secure by Letters Patent is:

1. In a multiple drive clutch and transmission control system for a vehicle, in combination, a directional control transmission switch having forward and reverse positions, an electroresponsive locking device normally holding said transmission switch against movement and operative upon energization of a control circuit to release said transmission switch, a drive selective clutch switch having a plurality of vehicle operating positions and a neutral position, said switch being constructed and arranged to prevent energization of said control circuit in any position except said neutral position, and auxiliary interlock safety control means interposed in said control circuit for also controlling energization of said locking device.

2. In a multiple drive clutch and transmission control system for a vehicle, in combination, a directional control transmission switch having forward and reverse positions, an electroresponsive locking device normally holding said transmission switch against movement and operative upon energization of a control circuit to release said transmission switch, a drive selective clutch switch having a plurality of vehicle operating positions and a neutral position, said switch being constructed and arranged to prevent energization of said control circuit in any position except said neutral position, and normally open auxiliary interlock switch means interposed in said control circuit in series relation with said clutch switch and said electroresponsive locking device.

3. In a multiple drive clutch and transmission control system for a vehicle, in combination, a directional control transmission switch having forward and reverse positions, an electroresponsive locking device normally holding said transmission switch against movement and operative upon energization of a control circuit to release said transmission switch, a drive selective clutch switch having a plurality of vehicle operating positions and a neutral position, said switch being constructed and arranged to prevent energization of said control circuit in any position except said neutral position, and safety interlock means cooperative with said transmission switch for controlling said circuit, said interlock means being responsive to the establishment of a certain operating condition for completing said circuit when said clutch switch is in said neutral position.

4. In a multiple drive clutch and transmission control system for a vehicle, in combination, a directional control transmission switch having forward and reverse positions, an electroresponsive locking device normally holding said transmission switch against movement and operative upon energization of a control circuit to release said transmission switch, a drive selective clutch switch having a plurality of vehicle operating positions and a neutral position, said switch being constructed and arranged to prevent energization of said control circuit in any position except said neutral position, and a normally open, manually operable interlocking switch interposed in said control circuit for preventing undesired energization of said electroresponsive locking device regardless of the position of said clutch switch.

5. In a multiple drive clutch and transmission control system for a vehicle, in combination, a directional transmission control device having forward and reverse positions, an electro-responsive locking device normally holding said transmission control device against movement and operative to release said transmission control device, a drive selective clutch controller having a plurality of vehicle operating positions and a neutral position, electrical means controlled by said clutch controller and constructed and arranged to prevent operation of said electroresponsive locking device to release said transmission control device except when said controller is in said neutral position, and interlock safety switch means cooperative with said clutch controller for also conditioning said electroresponsive locking device, said interlock safety switch means being manually operable to effect release movement of said locking device when said clutch controller is in neutral position.

6. In a multiple drive clutch and transmission control system for a vehicle equipped with fluid pressure brake means including a brake cylinder, in combination, a directional control transmission switch having forward and reverse positions, an electroresponsive locking device normally holding said transmission switch against movement and operative upon energization of a control circuit to release said transmission switch, a drive selective clutch switch having a plurality of vehicle operating positions and a neutral position, said clutch switch being constructed and arranged to prevent energization of said control circuit in any position except said neutral position, normally open interlock switch means interposed in said control circuit in series relation with said clutch switch and said electroresponsive locking device, and movable abutment means responsive to the pressure of fluid supplied to said brake cylinder for closing said interlock switch means.

7. In a multiple drive clutch and transmission control system for a vehicle equipped with fluid pressure brake means including a brake valve device having an application position, in combination, a directional control transmission switch having forward and reverse positions, an electro-responsive locking device normally holding said transmission switch against movement and operative upon energization of a control circuit to release said transmission switch, a drive selective clutch switch having a plurality of vehicle operating positions and a neutral position, said clutch switch being constructed and arranged to prevent energization of said control circuit in any position except said neutral position, normally open interlock switch means interposed in said control circuit in series relation with said clutch switch and said locking device, and means for effecting closure of said interlock switch means upon movement of said brake valve to said operating position.

SAMUEL JORY.